United States Patent
Gangi

(10) Patent No.: US 9,232,588 B2
(45) Date of Patent: Jan. 5, 2016

(54) FAULT TOLERANT LED BACKLIGHT FOR AN LCD DISPLAY

(71) Applicant: Aydin Displays, Inc., Birdsboro, PA (US)

(72) Inventor: Joseph G. Gangi, Pottstown, PA (US)

(73) Assignee: Aydin Display, Inc., Birdsboro, PA (US)

( * ) Notice: Subject to any disclaimer, the term of this patent is extended or adjusted under 35 U.S.C. 154(b) by 533 days.

(21) Appl. No.: 13/644,972

(22) Filed: Oct. 4, 2012

(65) Prior Publication Data

US 2014/0097750 A1    Apr. 10, 2014

(51) Int. Cl.
*H05B 37/00*    (2006.01)
*H05B 33/08*    (2006.01)
*G02F 1/1335*   (2006.01)

(52) U.S. Cl.
CPC .......... *H05B 33/0827* (2013.01); *G02F 1/1336* (2013.01)

(58) Field of Classification Search
USPC ............. 315/119, 121, 122, 123, 125, 185 R, 315/192, 291, 294, 297, 307, 310, 312, 361
See application file for complete search history.

(56) References Cited

U.S. PATENT DOCUMENTS

| | | | |
|---|---|---|---|
| 2010/0244701 A1* | 9/2010 | Chen ................. | G02F 1/133603 315/117 |
| 2011/0163682 A1* | 7/2011 | Jungwirth .......... | H05B 33/0818 315/192 |
| 2012/0068978 A1* | 3/2012 | Aitken ................ | G09G 3/3406 345/207 |

* cited by examiner

*Primary Examiner* — Douglas W Owens
*Assistant Examiner* — Jianzi Chen
(74) *Attorney, Agent, or Firm* — Caesar Rivise, PC

(57) ABSTRACT

Disclosed are LED backlight subassemblies and LCD displays making use thereof. The backlight subassembly includes at least one string of serially connected LEDs in which single LED failures do not lead to a partial or complete loss of image content.

23 Claims, 2 Drawing Sheets

FAULT TOLERANT LED BACKLIGHT FOR AN LCD DISPLAY

FIELD OF THE INVENTION

This invention relates generally to LCD displays and more particularly to LED illumination devices for illuminating an LCD panel of an LCD display.

BACKGROUND OF THE INVENTION

There are essentially two methods used to backlight transparent mode LCD panels, namely direct-lit (sometimes referred to as "array-lit") and edge-lit. As is known a direct-lit LED backlight provides a surface of illuminating light behind the entire image-producing area of an LCD panel used in a television, computer monitor or similar display apparatus, whereas an edge-lit backlight provides lighting from the edge of the LCD panel.

Due to the small and point source nature of conventional LED bulbs and chips many individual LED bulbs or chips ("LED Units") are needed to form the desired surface of light to adequately illuminate the relatively large image area involved. Typically, the LED units comprising the direct backlight are geometrically arranged in a simple checkerboard or skewed ("criss-cross") grid pattern. Further, the LED units are electrically connected in series or "strings" in order to match the relatively low forward voltage drop of the individual LED units to the typically higher and available power supply voltage within the television or video monitor.

The white LED units (whether in bulb form or chip form) used in LCD backlights have a forward voltage drop characteristic of between approximately 3.0 and 4.0 volts. This characteristic is considered the "operating voltage" of the LED. All LEDs, whether white or color, are generally operated in constant current ("CC") mode. This is because although LEDs have a fixed forward voltage characteristic, their light output is proportional to the current which flows through them, but not the voltage applied across them. This current is commonly referred to as the "operating current" of the LED. Unlike the more or less fixed operating voltage, the LED's operating current can be varied over a wide range in order to control the light output of the LED. In a typical direct LED backlight the operating current of each individual LED unit is in the range of tens of milliamps to hundreds of milliamps—depending primarily on the type of LEDs incorporated and the desired illumination level.

Most modern day electronic equipment incorporates an AC-to-DC power supply to derive the relatively low DC voltages needed by the equipment's internal electronic circuitry from the relatively high 60 Hz power mains of our public electrical distribution system. These "resident" DC power supplies typically produce an output in the range of 12 to 48 volts DC—considerably higher than the operating voltage (3-4 volts DC) of the white LEDs used in the subject backlights. Thus, a common design practice has developed of connecting the LED units in series-connected strings in which the forward voltages of the LEDs add arithmetically by well-known electric circuit laws, thereby achieving a voltage "match" between the LED operating voltage and the resident DC power supply. For example, if a power supply voltage of 24 VDC is present for other reasons in the equipment, the LED strings are composed of 6, 7 or 8 LED units to "match" the available supply voltage. Since a direct LCD backlight may need dozens or hundreds of LED units to fulfill the illumination area requirements, many such LED strings are utilized to fulfill that total required LED unit count. For example, a 20 inch diagonal LCD direct backlight might require 160 LED units to produce a sufficient and uniform backlight illumination surface. If the resident power supply is 24 VDC, the natural backlight topology would consist of 20 strings each containing 8 LEDs. Each string is equipped with its own CC driver circuit deriving its power from the resident power supply. All 20 strings with their associated CC drivers are essentially connected in parallel.

Such a typical backlight circuit topology is shown in FIG. 3. Six strings each containing eight LED units are shown. The LED symbols are shown in a physical rectilinear grid arrangement as is typical of contemporary industry practice. Current generated in the DC Power Supply is regulated to a fixed value by the constant current driver C, which connects to LED A, then LED B, and so forth, though to LED H and back into the negative side of the DC Power Supply. The LED units' operating current is thus set by the constant current source C, while their individual operating voltages are set by the E-I curve of the individual LED units.

This circuit topology, often referred to as "parallel-series strings", is ubiquitous in the contemporary LCD backlight universe—both for edge-lit and direct types. Although the physical arrangement of the LED units in an edge-lit backlight is different than for a direct backlight, the same parallel-series string ("PSS") circuit topology is found in edge-lit backlights for the same electrical reasons.

LED units can fail in two ways—open or shorted. The general cause of failures in backlights is overheating because of the physically constrained nature of the LED strings and the consequent lack of an adequate thermal transport mechanism to carry away the copious heat produced by the LED units. It is not known which failure mechanism is more dominant (failed-open or failed-short), but it is known that each type of failure has been experienced in real world equipment.

The effect of each failure type (i.e., open or shorted) is quite different when it occurs in a single LED unit in the ubiquitous string PSS topology. If a single LED unit fails open in a string, the complete string will extinguish. If a single LED unit fails shorted in a string, the remaining LED units will continue to illuminate at approximately their pre-failure output level. Obviously, the fail-open mechanism is the more onerous of the two, as a complete section of the dependent LCD image is lost to some degree to the viewer. The degree of loss is dependent on how much illumination is available from adjacent, still-operating LED strings. The detrimental impact of this partial loss-of-image on the end-use of the equipment depends on the criticality of the application and the type of image displayed. As an extreme example, in an air traffic control display, a dark (un-illuminated) bar-shaped area can hide aircraft momentarily or long-term depending on the direction of travel of the aircraft symbol across the screen.

Accordingly, a need exists for an LED illumination subassembly which overcomes the disadvantages of the prior art. The subject invention addresses that need by providing an LED illumination display which minimizes if not eliminates the effect of at loss of light from an LED string. For example, in accordance with one aspect of this invention the LED units are electrically connected in such a way that the loss of one string of LED units does not seriously diminish the picture content of the displayed image. In accordance with another aspect of this invention a "standby" LED unit automatically illuminates when a primary LED unit fails open. In accordance with yet another aspect of this invention, when a single LED unit in a string fails open, the remaining LED units of the string continue to operate normally.

SUMMARY OF THE INVENTION

In accordance with one aspect of the invention there is provided an LED illumination subassembly for an LCD display. The LCD display comprises an LCD panel. The subassembly comprises a plurality of LED strings and a plurality of constant current source drivers. Each of the LED strings comprises at least two serially connected LEDs connected in series with a respective one of said constant current source drivers. Each of the LED strings is arranged in an array, with the array being arranged to be disposed adjacent the LCD panel wherein the LEDs of each of the strings of the array extends non-linearly across the LCD panel in a pseudo-random pattern.

In accordance with another aspect of this invention there is provided an LED illumination subassembly for an LCD display. The subassembly comprises a plurality of LED strings and a plurality of constant current source drivers. Each of the LED strings comprises at least two serially connected LEDs connected in series with a respective one of the constant current source drivers. Each of the LEDs of each of the strings has associated with it at least one respective electronic component arranged to enable the other LEDs of the string to produce light in the event that any LED in the string should fail open. In one exemplary embodiment of this invention the at least one electronic component comprises a reverse oriented zener diode, and wherein each reverse oriented zener diode shunts a respective LED of the LED string. In another exemplary embodiment of this invention the at least one electronic component comprises a respective back-up LED connected in series with a respective diode to form a back-up LED path and wherein each back-up LED path shunts a respective LED of the LED string.

In accordance with another aspect of this invention there is provided an LCD display comprising an LCD panel and at least one LED illumination subassembly constructed as discussed above.

In accordance with still another aspect of this invention there is provided an LED illumination subassembly constructed as discussed above but arranged for use in applications other than for illuminating an LCD display.

DETAILED DESCRIPTION OF THE PREFERRED EMBODIMENT

Figure 1:
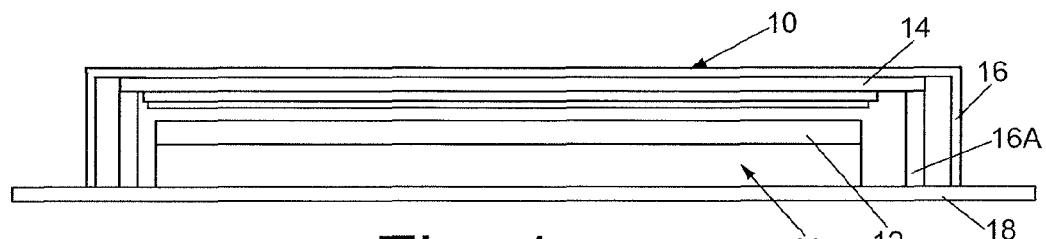
FIG. 1 is a side elevation view of an exemplary embodiment of a direct-lit LCD assembly having an LED illumination subassembly constructed in accordance with the subject invention.

Referring now to the various figures of the drawing wherein like reference characters refer to like parts, there is shown in FIG. 1 one exemplary embodiment of a LCD assembly 10 having an LED illumination subassembly 20 constructed in accordance with the subject invention. The LCD assembly 10 basically comprises a direct-lit LED illumination subassembly 20, a diffuser 12 and an LCD panel 14 located within a frame 16. The subassembly 20 is in the form an array of plural LED strings covering a defined area. The LED strings are formed of plural LED units ("LEDs") connected in series. The diffuser is disposed over the LED string array to diffuse the light produced thereby and to provide that light to illuminate the LCD panel 14, which is disposed above the diffuser. The frame 16 holds the various components together to enable them to be mounted on a PC board 18 or some other substrate or structure. The frame may also include elastomeric strips 16A to hold the assembly in place within the frame.

Figure 2:
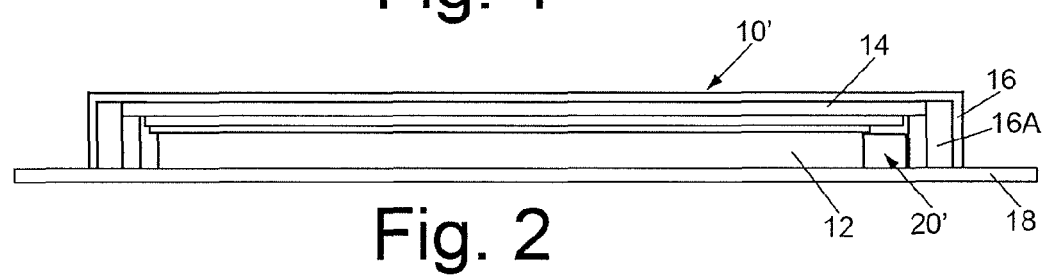
FIG. 2 is a side elevation view of an exemplary embodiment of an edge-lit LCD assembly having an LED illumination subassembly constructed in accordance with the subject invention.

FIG. 2 shows an exemplary embodiment of a LCD assembly 10' having an LED illumination subassembly 20' constructed in accordance with the subject invention. The LCD assembly 10' basically comprises an edge-lit LED illumination subassembly 20', a diffuser 12 and an LCD panel 14 located within a frame 16. In this embodiment the LED illumination subassembly, being edge-lit, is located on the side of the diffuser, so that light produced by it is propagated across the entire area of the diffuser from the edge at which the subassembly 20' is located. Like the embodiment of FIG. 1, the LCD panel 14 is located on top of the diffuser, so that the light provided from the diffuser illuminates the LCD display.

Figure 3:
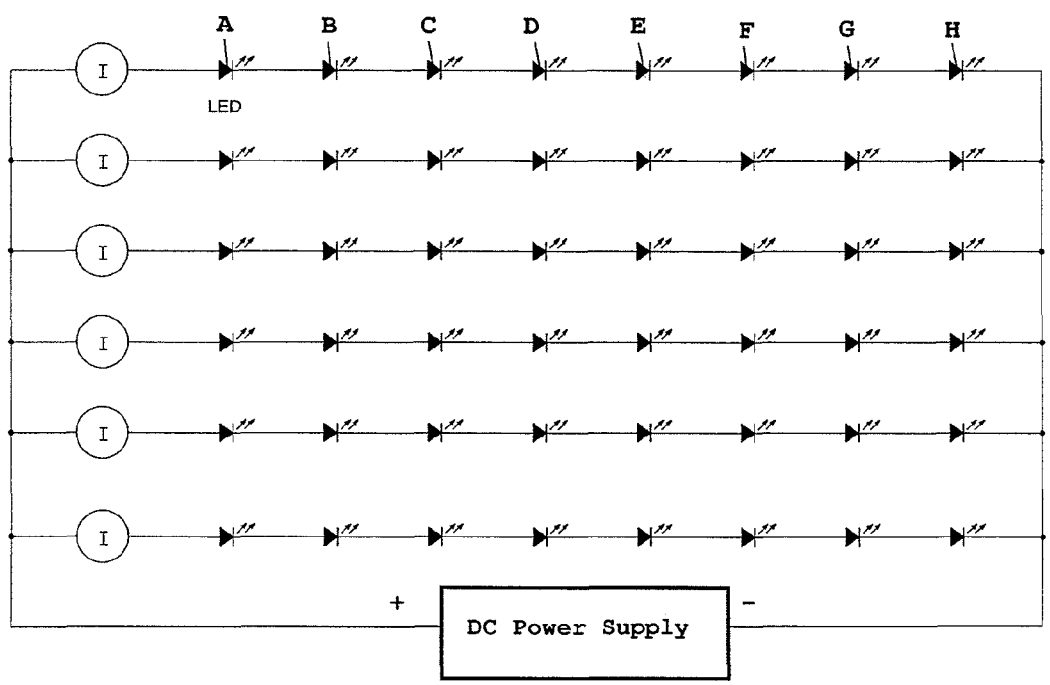
FIG. 3 is a schematic diagram of a prior art LED illumination array of plural LED strings for illuminating an LCD display.
Figure 4:
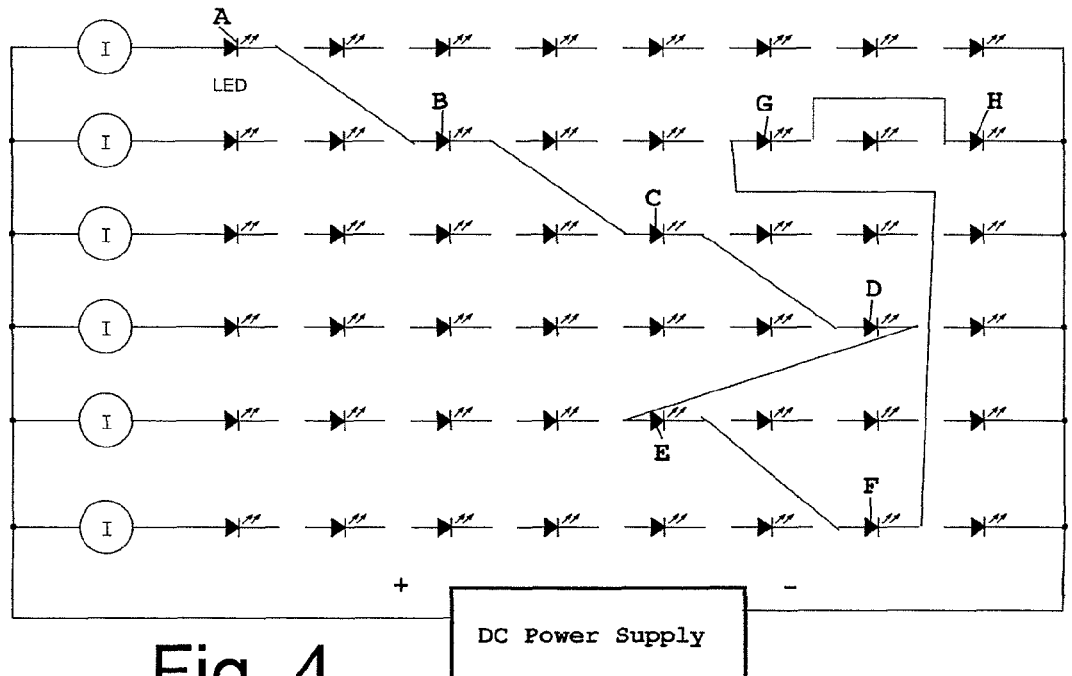
FIG. 4 is a schematic diagram of an exemplary LED illumination subassembly constructed in accordance with this invention and including plural LED strings for illuminating an LCD display, wherein the loss of any LED string does not substantially compromise the illumination of the LCD display.

Referring now to FIG. 4 there is shown an exemplary LED illumination subassembly 20 constructed in accordance with this invention and including plural LED strings for illuminating an LCD display, wherein the loss of any LED string does not substantially compromise the illumination of the LCD display. The subassembly 20 is arranged in the same industry standard rectilinear grid of LED units as in FIG. 3. However, the LED units are of the subassembly 20 connected differently. In particular, there is still one constant current driver 22 per string, and there are still eight LED units in any one string. The difference is that each electrical string is wired in such a way as to avoid including physically-adjacent LED units in the same string. In this figure only the connections for one string are shown for clarity. The other five strings are wired in a similar pseudo-random manner, avoiding inclusion of adjacent LED units in the same string. There are many connection patterns possible which will impart the intended image-loss immunity to the display. The selection of a particular connection pattern depends somewhat on the number of required strings, the LEDs-per-string and the aspect ratio of the LCD screen.

Thus, with the subject invention, even though there may be a loss of illumination from the loss of an LED string, the fact that the string is in a pseudo-random pattern across the face of the LCD panel minimizes the loss. In particular, in the example of the air traffic control display the subject invention provides a better situation by leaving the failure-compromised image with a group of smaller, separated darkened areas rather than one long bar-shaped area. The shape and location of the affected image loss areas is or course dependent on the physical arrangement of the individual LED units in the LED strings. Thus, the subject invention provides a more desirable failure mode by arranging the LED units in a given string in a pseudo-random manner throughout the area of the backlight.

The pseudo-random distribution of LED units of a single string also provides immunity from catastrophic image loss when a constant current driver fails for a single string. In such a case all of the LEDs in the string will extinguish in the same manner as they do when a single LED unit fails-open. The result is a "blotched" display rather than a confined dark area. Likewise, the pseudo-random distribution of LED units provides the same benefit when an electrical connection to the LED string fails-open. This includes any wires, connector pins, solder joints, printed wiring traces, and the like.

Figure 5:
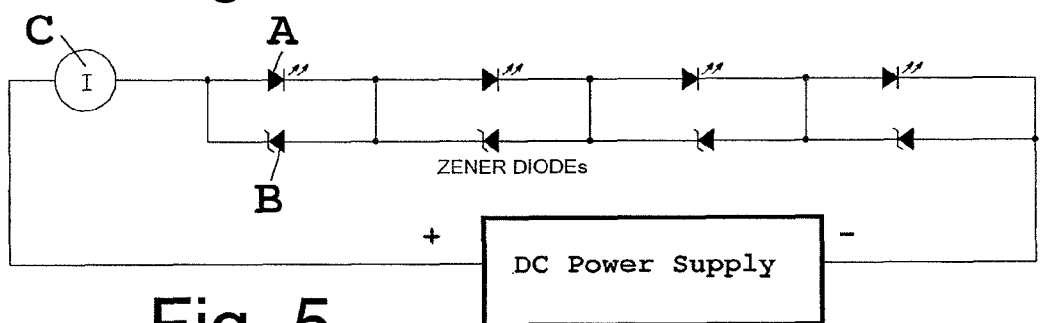
FIG. 5 is a schematic diagram of an exemplary LED string forming a portion of an illumination subassembly constructed in accordance with this invention for illuminating an LCD display, wherein the failure of any LED in the string in an open state does not result in the other LEDs of the string to cease operating.

FIG. 5 shows an LED string of a subassembly constructed in accordance with this invention which ameliorates the image loss when a single LED unit in the string fails. In this embodiment each LED is shunted by a reverse-oriented Zener diode having a reverse breakdown voltage greater than the shunted LED unit's forward voltage drop. For example, if the white LED unit "A" can range from, 3.9 to 4.1 volts, the shunting Zener "B" should have a reverse breakdown voltage of approximately 4.8 volts. In normal operation, with un-failed LED unit "A" conducting its operating current, the Zener is non-conducting because the LED forward voltage drop never allows the voltage across parallel connected Zener "B" to exceed B's breakdown voltage of 4.8 volts. However, if LED unit "A" fails open, it will no longer impose its forward voltage drop across "B" and that voltage will instantaneously rise to the reverse breakdown voltage (4.8 volts) of Zener "B" by virtue of the voltage compliance of the constant current source driver "C", whereupon Zener "B" will begin conducting a current equal to that of all the remaining LED units in the string. Consequently, all of the remaining non-failed LEDs in the string will continue emitting light at their same pre-failure output level. Of course, there will be a single dark area in the displayed image caused by the inability of LED unit "A" to produce light in its failed state. Obviously, this is a better failure scenario compared to the greater image loss which would have occurred should the entire string of LED units not emit light due to a single LED unit fail-open as described previously. In a certain sense, the inclusion of the shunting Zener diodes in the entire string as illustrated in FIG. 5 imparts a "self-healing" characteristic to the string, and when included in every LED string of the backlight, to the backlight in its entirety.

Figure 6:
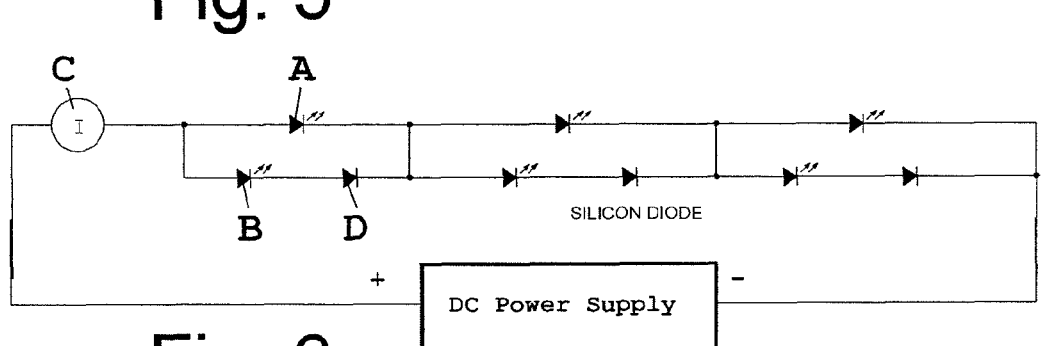
FIG. 6 is a schematic diagram of an exemplary LED string forming a portion of an illumination subassembly constructed in accordance with this invention for illuminating an LCD display, wherein the failure of any LED to illuminate is compensated by the illumination of a standby LED.

FIG. 6 shows an LED string of a subassembly constructed in accordance with this invention which exhibits what could be called a "self-healing" feature. To that end, LED unit "A" is shunted by the series-connected combination of an identical LED unit "B" and a silicon diode "D". When LED unit "A" is functioning normally, no current flows through either auxiliary shunting LED "B", or series connected diode "D". This is because the combined forward voltage drops of "B" plus "D" is greater by approximately 700 millivolts than the forward voltage drop of primary LED unit "A". However, if LED unit "A" should fail open, the voltage across its terminals and the series-connected combination of "B" plus "D" will rise by virtue of the voltage compliance of constant current driver "C", until that voltage exactly equals the arithmetic sum of the forward voltage drop of auxiliary shunt LED unit "B" and that of silicone diode "D". Consequently, a current of the same magnitude as that which flowed in the un-failed LED unit "A" will now flow through "B" and "B". Since "B" is conducting a current which is identical to that which flowed through LED unit "A" prior to its failure, LED unit "B" will produce virtually the same light output as did "A". Thereby, it can be reasonably stated that this topology has imparted the quality of "self-healing" upon the topologies shown in FIGS. 3 and 4.

FIG. 6 further shows a backlight string of LED units in which all of the primary LED units are shunted by the shunt LED and diode elements described above. Should any single primary LED fail-open in this string, the corresponding secondary LED "B" will automatically conduct the CC drive current regulated by "C", thereby producing substantially the same amount of light which was produced by the primary LED "A" before failure.

In order to fully take advantage of the self-healing features descried above the constant current driver must be designed with enough voltage compliance and power supply headroom so that it will correctly drive the string at the same current in the failed state as it did in the un-failed state, and the power supply voltage or the number of LED units-per-string must also be sized accordingly. Any person skilled in the constant current source design art will know how to design such a circuit with enough voltage compliance and power supply headroom that the LED string could self-heal itself even when 2, 3 or more of its primary LEDs fail.

Of course, if the constant current source driver or any of the electrical circuit connections (wires, solder joints, etc.) should fail in this self-healing topology the entire string will extinguish. Accordingly, a prudent backlight design would physically disperse the individual LED units of the string in the pseudo-random manner previously described so that the resultant image loss is minimized.

As is known, edge-lit backlights possess an inherent characteristic of blending the light emitted from all its individual LED units into a single "glow" or aurora. The loss of the light from one LED (e.g., a failed-shorted unit) merely diminishes the overall brightness level of the glow. Therefore, there is little or no advantage in physically distributing the LEDs in this type of backlight in the pseudo-random manner described above. However, because edge-lit backlights are electrically arranged in series-connected strings for exactly the same voltage-matching reasons they are in direct-lit backlights, and because they exhibit the same failure modes, the two self-healing techniques described above should provide an added degree of reliability and robustness to an edge-lit backlight unit.

It must be pointed out at this juncture that the shunting arrangements using either a zener diode or an LED and a serially connected diode are merely exemplary of various shunt arrangements that can be used to carry out the subject invention. Thus, other shunt arrangements can comprise multiple series-connected forward-biased diodes acting in effect as a reverse-biased zener. Alternatively, it can comprise an N-Phi circuit consisting of a single bipolar transistor and two biasing resistors which acts similarly to a zener diode. In this case, the ratio of the two resistors set the equivalent "avalanche" voltage. Still another alternative is two forward biased LEDs. In that case, when the primary LED unit opens, the two back-up LEDs will light. If those back-up LEDs are a different color than the primary LED, an automatic fault indication is provided. Yet another alternative is an active voltage-controlled FET circuit. In that case, the high voltage produced by the open-circuited primary LED triggers this circuit to power the back-up LED.

It should also be noted that while the preferred embodiments shown and described above make use of a constant current source for driving the LED string, other arrangements are contemplated by this invention. For example, although it is less preferred, a current limiting resistor could be used in place of the constant current source.

Without further elaboration the foregoing will so fully illustrate my invention that others may, by applying current or future knowledge, adopt the same for use under various conditions of service.

What is claimed is:

1. An LED illumination subassembly for an LCD display, the LCD display comprising an LCD panel, said subassembly comprising a plurality of LED strings and a plurality of constant current source drivers, each of said LED strings comprising at least two serially connected LEDs connected in series with a respective one of said constant current source drivers, each of said LED strings being arranged in an array, said array being arranged to be disposed adjacent the LCD panel wherein said LEDs of each of said strings of said array extends non-linearly across the LCD panel in a pseudo-random pattern.

2. The subassembly of claim 1 wherein each of said LEDs of each of said strings has associated with it at least one respective electronic component arranged to enable the other LEDs of said string to produce light in the event that any LED in said string should fail open.

3. The subassembly of claim 2 wherein each of said at least one electronic components comprises a reverse oriented zener diode, and wherein each reverse oriented zener diode shunts a respective LED of said LED string.

4. The subassembly of claim 2 wherein each of said at least one electronic components comprises a respective back-up LED connected in series with a respective diode to form a back-up LED path and wherein each back-up LED path shunts a respective LED of said LED string.

5. The subassembly of claim 1 wherein said subassembly is arranged to be connected across a DC power supply.

6. An LED illumination subassembly for an LCD display, said subassembly comprising a plurality of LED strings and a plurality of constant current source drivers, each of said LED strings comprising at least two serially connected LEDs connected in series with a respective one of said constant current source drivers, each of said LEDs of each of said strings having associated with it at least one respective electronic component arranged to enable the other LEDs of said string to produce light in the event that any LED in said string should fail open, said plurality of LED strings being disposed in an array adjacent an LCD panel of the LCD display wherein the LEDs of each of said strings of said array extends non-linearly across the LCD panel in a pseudo-random pattern.

7. The subassembly of claim 6 wherein each of said at least one electronic components comprises a reverse oriented zener diode, and wherein each reverse oriented zener diode shunts a respective LED of said LED string.

8. The subassembly of claim 6 wherein each of said at least one electronic components comprises a respective back-up LED connected in series with a respective diode to form a back-up LED path and wherein each back-up LED path shunts a respective LED of said LED string.

9. The subassembly of claim 6 wherein said subassembly is arranged to be connected across a DC power supply.

10. The subassembly of claim 6 wherein said subassembly comprises an array-lit unit for illuminating an area of an LCD panel of the LCD display.

11. An LCD display comprising an LCD panel and at least one LED illumination subassembly, said subassembly being located adjacent said LCD panel and comprising a plurality of LED strings and a plurality of constant current source drivers, each of said LED strings comprising at least two serially connected LEDs connected in series with a respective one of said constant current source drivers, each said at least two serially connected LEDs of each of said strings having associated with it a respective diode arranged to enable the other LEDs of the string to produce light in the event that any LED in said string should fail open, said plurality of LED strings being disposed in an array adjacent an LCD panel of the LCD display wherein the LEDs of each of said strings is disposed non-linearly across the LCD panel in a pseudo-random pattern.

12. The LCD display of claim 11 wherein a respective back-up LED is connected in series with a respective one of said diodes to form a back-up LED path and wherein each of said LEDs of said string includes a respective back-up LED path connected in shunt with it.

13. The LCD display of claim 11 wherein each of said diodes comprises a reverse oriented zener diode shunting a respective LED of said LED string.

14. The LCD display of claim 11 wherein a respective back-up LED is connected in series with a respective one of said diodes to form a back-up LED path and wherein each of said LEDs of said string includes a respective back-up LED path connected in shunt with it.

15. The LCD display of claim 11 wherein said subassembly comprises an array-lit unit for illuminating an area of said LCD panel.

16. The LCD display of claim 11 wherein said subassembly is arranged to be connected across a DC power supply.

17. An LED illumination subassembly comprising a plurality of LED strings and a plurality of constant current source drivers, each of said LED strings comprising at least two serially connected LEDs connected in series with a respective one of said constant current source drivers, each of said LED strings being arranged in an array, said array being arranged such that said LEDs of each of said strings of said array extends non-linearly across an area in a pseudo-random pattern.

18. The subassembly of claim 17 wherein each of said LEDs of each of said strings has associated with it at least one respective electronic component arranged to enable the other LEDs of said string to produce light in the event that any LED in said string should fail open.

19. The subassembly of claim 17 wherein each of said at least one electronic components comprises a reverse oriented zener diode, and wherein each reverse oriented zener diode shunts a respective LED of said LED string.

20. The subassembly of claim 17 wherein each of said at least one electronic components comprises a respective back-up LED connected in series with a respective diode to form a back-up LED path and wherein each back-up LED path shunts a respective LED of said LED string.

21. An LED illumination subassembly comprising a plurality of LED strings and a plurality of constant current source drivers, each of said LED strings comprising at least two serially connected LEDs connected in series with a respective one of said constant current source drivers, each of said LEDs of each of said strings having associated with it at least one respective electronic component arranged to enable the other LEDs of said string to produce light in the event that any LED in said string should fail open, said plurality of LED strings being disposed in an array wherein each of said strings of said array extends non-linearly across an area in a pseudo-random pattern.

22. The subassembly of claim 21 wherein each of said at least one electronic components comprises a reverse oriented zener diode, and wherein each reverse oriented zener diode shunts a respective LED of said LED string.

23. The subassembly of claim 21 wherein each of said at least one electronic components comprises a respective back-up LED connected in series with a respective diode to form a back-up LED path and wherein each back-up LED path shunts a respective LED of said LED string.

* * * * *